(12) United States Patent
Borlee

(10) Patent No.: US 9,000,944 B2
(45) Date of Patent: Apr. 7, 2015

(54) DEVICE FOR DETECTING A BLOCKAGE OF A MECHANICAL FLUID METER, AND METER FEATURING BLOCKAGE DETECTION

(75) Inventor: Jean-Paul Borlee, Bures sur Yvette (FR)

(73) Assignee: Suez Environnement (FR)

( * ) Notice: Subject to any disclaimer, the term of this patent is extended or adjusted under 35 U.S.C. 154(b) by 450 days.

(21) Appl. No.: 13/501,289

(22) PCT Filed: Oct. 11, 2010

(86) PCT No.: PCT/IB2010/054584
§ 371 (c)(1),
(2), (4) Date: May 3, 2012

(87) PCT Pub. No.: WO2011/045725
PCT Pub. Date: Apr. 21, 2011

(65) Prior Publication Data
US 2012/0206272 A1    Aug. 16, 2012

(30) Foreign Application Priority Data
Oct. 14, 2009   (FR) ...................................... 09 04926

(51) Int. Cl.
| | | |
|---|---|---|
| G08B 23/00 | (2006.01) |
| G08B 17/02 | (2006.01) |
| G08B 19/02 | (2006.01) |
| G08B 21/02 | (2006.01) |
| G01F 1/68 | (2006.01) |
| G01F 11/02 | (2006.01) |
| G01P 13/00 | (2006.01) |
| G01F 15/00 | (2006.01) |
| G01F 15/10 | (2006.01) |
| G01F 25/00 | (2006.01) |

(52) U.S. Cl.
CPC .............. *G01P 13/006* (2013.01); *G01F 15/00* (2013.01); *G01F 15/10* (2013.01); *G01F 25/0007* (2013.01)

(58) Field of Classification Search
None
See application file for complete search history.

(56) References Cited

U.S. PATENT DOCUMENTS

| | | | | |
|---|---|---|---|---|
| 3,913,398 | A * | 10/1975 | Curtis | ........................ 73/152.33 |
| 4,495,488 | A * | 1/1985 | Streib | ............................ 340/606 |
| 2010/0037688 | A1* | 2/2010 | Inoue et al. | ................ 73/204.11 |

FOREIGN PATENT DOCUMENTS

| | | |
|---|---|---|
| DE | 10225722 C1 | 12/2003 |
| DE | 102007043814 A1 | 3/2009 |
| EP | 1308701 A2 | 5/2003 |
| FR | 2904688 A1 | 2/2008 |
| JP | 11142194 A | 5/1999 |

* cited by examiner

Primary Examiner — Julie Lieu
(74) Attorney, Agent, or Firm — The Belles Group, P.C.

(57) ABSTRACT

A mechanical fluid meter, for liquid or gas, includes an electronic device (E) that has means for metering, and generally also displaying, consumption, said fluid meter including: at least one fluid temperature sensor (3) near the meter and at least one ambient temperature sensor (4) where the meter is installed; a connection means between the temperature sensors (3, 4) and the electronic device (E); and analysis means (5) for establishing the temperature difference (Δθ) between the fluid temperature and the ambient temperature and for taking into account the fluid flow rate value supplied by the meter, said analysis means being programmed so as to display and/or transmit information indicating a meter blockage when the temperature difference (Δθ) is higher than a predetermined limit and the flow rate value supplied by the meter is zero.

11 Claims, 2 Drawing Sheets

Figure 1:
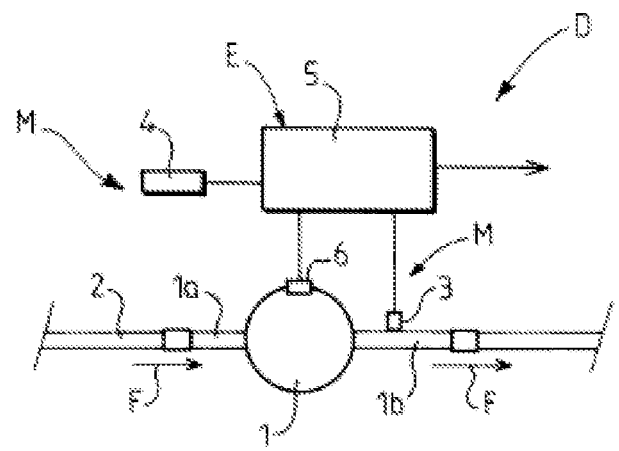

DEVICE FOR DETECTING A BLOCKAGE OF A MECHANICAL FLUID METER, AND METER FEATURING BLOCKAGE DETECTION

PRORITY

Priority is claimed as a national stage application, under 35 U.S.C. 0 371, to PCT/IB2010/054584, filed Oct. 11, 2010, which claims priority to French Application No. 0904926, filed Oct. 14,2009. The disclosure of the aforementioned priority applicationsare incorporated herein by reference in their entirety.

The invention relates to a device for detecting the blockage of a mechanical meter for metering fluid or liquid, in particular a water meter.

The invention also relates to a mechanical meter for metering fluid or liquid, with blockage detection, in particular a water meter.

Mechanical water meters, usually based on turbines or rotary pistons, currently have great metrological accuracy for a reasonable cost. It however happens during the life of the meter that the moving parts become blocked following the passage of an impurity or of a foreign body in the delivered fluid (grain of sand, fragment of seal, etc.). For the operator of the delivery network, this leads to a marked loss of billing because the subscriber continues to consume water without any volume being registered by the meter.

It is difficult, in the prior art, to make a distinction between a blocked meter and an absent user—in both cases the meter registers no water volume—even when the meter is frequently read, in the case for example of a remote meter-reading system.

In order to solve this important problem of mechanical meter blockage, the operators are currently tempted to substitute for them static meters with no moving parts —ultrasound or electromagnetic technology. In principle, these meters cannot become blocked.

However, static meters are still quite costly, which restricts the diffusion thereof only to large consumers generating high billed volumes and therefore to large—capacity meters (medium and large calibers).

In parallel with purely static meters, the meter manufacturers are beginning to propose mechanical meters incorporating an electronic portion designed for display functions (liquid crystal display screen) and above all for remote meter reading functions by radio transmission.

The main object of the invention is to propose a device for detecting the blockage of a mechanical fluid meter which makes it possible, for a reduced cost, to increase the reliability of the mechanical meters and to make it easier to identify blocked meters in order to replace them.

According to the invention, a device for detecting the blockage of a mechanical fluid meter is characterized in that it comprises:
  means for measuring the temperature of the fluid in the vicinity of the meter and of the temperature of the surroundings where the meter is,
  and analysis means for establishing the temperature difference ($\Delta\theta$) between the temperature of the fluid and the temperature of the surroundings, and for taking into account the value of the fluid flow rate supplied by the meter, these analysis means being programmed in order to display and/or transmit a meter-blocked item of information when the temperature difference is greater than a determined limit and when the flow-rate value supplied by the meter is zero.

The analysis means may be programmed to display and/or transmit a meter-blocked item of information when the temperature difference ($\Delta\theta$) is greater than a predefined threshold, in particular 5° C., and when the flow-rate value supplied by the meter is zero.

The sensor for sensing the temperature of the fluid may be installed downstream or upstream of the meter, in the vicinity of this meter, or be directly incorporated into the meter.

The device for detecting the blockage may consist of a separate unit, fitted to a meter, or may be incorporated into the meter.

The invention also relates to a mechanical meter for metering fluid liquid, comprising an item of electronic equipment with means for metering, and usually for displaying, consumption, characterized in that it comprises:
  at least one sensor for sensing the temperature of the fluid in the vicinity of the meter and at least one sensor for sensing the temperature of the surroundings in which the meter is installed;
  a means for connection between the temperature sensors and the item of electronic equipment,
  and analysis means for establishing the temperature difference ($\Delta\theta$) between the temperature of the fluid and the temperature of the surroundings, and for taking into account the value of the fluid flow rate supplied by the meter, these analysis means being programmed to display and/or transmit a meter-blocked item of information when the temperature difference ($\Delta\theta$) is greater than a determined limit and when the flow-rate value supplied by the meter is zero.

The analysis means may be programmed to display and/or transmit a meter-blocked item of information when the temperature difference ($\Delta\theta$) is greater than a predefined threshold, for example 5° C., and when the flow-rate value supplied by the meter is zero.

Advantageously, the sensor for sensing the temperature of the fluid may be installed downstream or upstream of the meter, in the vicinity of this meter or be directly incorporated into the meter.

The analysis means may be programmed to carry out analyses periodically and to transmit a meter-blocked item of information only after a minimum number of analyses, over a determined period, indicating a temperature difference ($\Delta\theta$) greater than a determined limit while the flow-rate value supplied by the meter is zero.

According to another possibility, the analysis means are programmed to total the time during which the temperature difference ($\Delta\theta$) exceeds the determined limit when no flow rate is indicated by the meter, and to transmit a meter-blocked item of information only when the total time exceeds a predetermined value.

Advantageously, the meter comprises a display on which a comment of the "meter blocked" type is displayed when the blockage is detected.

When the meter comprises an item of electronic equipment designed to carry out remote meter reading functions by radio transmission, the item of electronic equipment is preferably designed to transmit the meter-blocked item of information remotely.

More particularly, the invention relates to a water meter having the features defined above.

Figure 2:
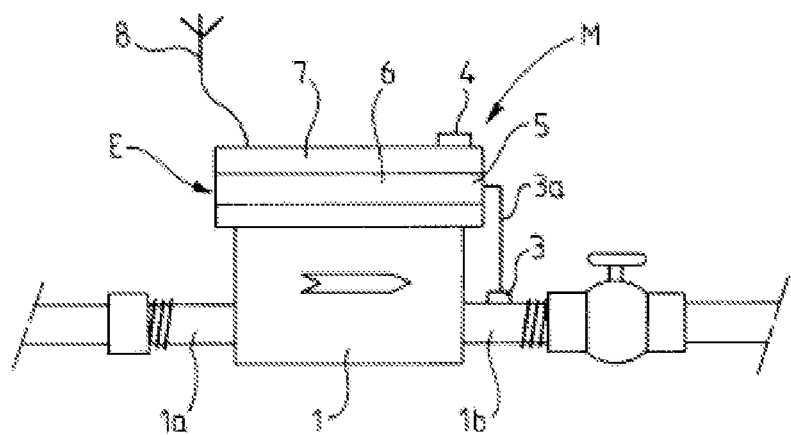
Figures 3, 4:
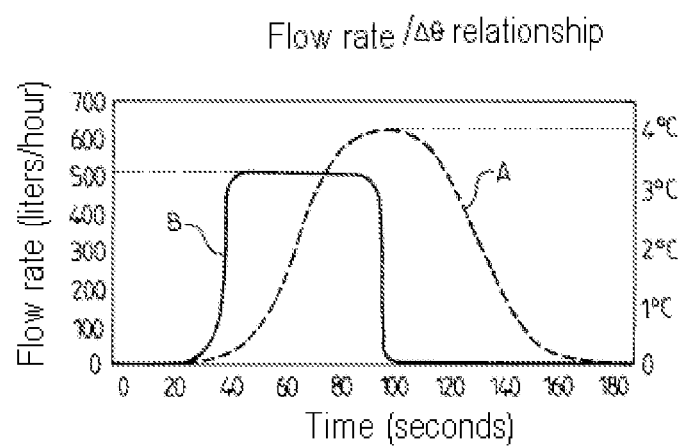

Apart from the arrangements set out above, the invention consists of a certain number of other arrangements that will be addressed more explicitly below concerning examples which are described with reference to the appended drawings, but which are in no way limiting. In these drawings:

FIG. 1 is a diagram of a device for detecting the blockage of a mechanical fluid meter according to the invention, FIG. 2 is a schematic view in elevation of a mechanical fluid meter incorporating a device for detecting a blockage according to the invention, FIG. 3 is a graphic representation, as a function of the time recorded on the x axis, of a variation in flow rate recorded as a y coordinate on the y axis on the left and of the variation in the temperature difference between fluid and ambient temperature recorded on the y axis on the right, and FIG. 4 is a representation of a decision model for the detection of the blockage.

With reference to FIG. 1, it shows a device D for detecting the blockage of a mechanical fluid meter 1, more particularly a water meter, installed on a pipe 2. The meter 1 comprises an upstream fitting 1a and a downstream fitting 1b, the fluid flowing in the direction of the arrows F from left to right according to FIG. 1.

The device D comprises means M for measuring the temperature difference between the temperature of the fluid in the vicinity of the meter 1 and the temperature of the surroundings where the meter is. These measuring means M comprise a temperature sensor 3 for sensing the temperature of the fluid in the vicinity of the meter 1. Preferably, this sensor 3 is situated immediately downstream or upstream of the meter 1, for example on the fitting 1b, or in the body of the meter itself. Another temperature sensor 4 is designed to sense the temperature of the surroundings in the vicinity of the meter 1, in particular the temperature of the premises in which the meter may be found.

The outputs of the sensors 3, 4 are connected respectively to an input of an electronic assembly E comprising analysis means 5 for determining the difference in the temperatures supplied by the sensors 3 and 4 and for carrying out an analysis, usually periodically, of this difference while taking account of the fluid flow-rate value supplied by the meter 1. This value is usually supplied to the assembly E by a transducer 6 installed on the meter.

The detection device D may consist of a separate unit which will be installed on a mechanical meter that is not yet fitted with an electronic portion.

However, when the mechanical meter incorporates an electronic portion, notably for displaying or remote meter reading by radio transmission, as is increasingly frequently becoming the case, the electronic assembly E is already installed in the meter 1, with the transducer 6 as illustrated in FIG. 2. Moreover, the meter is usually fitted with a radio transmitter 7 with antenna 8 for remotely transmitting the items of information on the measured flow rate. The electronic assembly E is adapted, notably by programming, to perform the function of the analysis means 5.

The sensor 3 for sensing the fluid temperature may be installed on the downstream fitting 1b. The output of the sensor 3 is connected via a conducting wire 3a to the electronic assembly E. The ambient temperature sensor 4 may be installed above the casing of the transmitter 7 and be connected via a conducting wire, that cannot be seen, to the assembly E. The output from the item of equipment E is connected to the transmitter 7 so that the meter-blocked item of information can be transmitted by radio, via the antenna 8.

As a variant, the fluid temperature sensor could be installed on the upstream fitting 1a, or in the body of the meter itself. Several fluid temperature sensors, for example an upstream sensor and a downstream sensor could be provided, as could several ambient temperature sensors in order to obtain a representative average.

The invention, in the case of a mechanical meter incorporating an electronic portion as illustrated in FIG. 2, uses the measuring and computing capability of the electronics that are already on board the meter for detecting the blockage of the measuring moveable portion.

It is sufficient to supplement the meter with two temperature sensors 3, 4, one for measuring the temperature of the fluid, the other the ambient temperature, and to connect these sensors to the electronic assembly E comprising a computer which will be programmed to constitute the analysis means 5 and estimate the temperature difference ($\Delta\theta$) between the fluid and the ambient temperature. By associating this measurement of temperature difference ($\Delta\theta$) with the measurement of flow rate taken by the computer for performing the metering function, it becomes possible to obtain periodically, or for predefined flow-rate values, ($\Delta\theta$, flow rate) measurement pairs.

The detection principle lies in the fact that the water delivered to the end consumer is conveyed by a delivery network that is buried usually approximately 1 m beneath ground level in order to be protected from the frost. The temperature of the water is therefore close to 15° C. Depending on the position of the water meter 1, the ambient temperature is different from the temperature of the delivered water: in summer, for a meter installed in a sight hole or in an individual house, the ambient temperature may greatly exceed 20° C. It is therefore frequent to find, depending on the seasons, considerable temperature differences (several degrees) between the water and the surroundings when the water has flowed for a sufficiently long period in the meter.

In the event of zero flow rate, the water contained in the meter will begin to warm up under the influence of the ambient temperature until it reaches the same value as the ambient temperature after a relatively long time.

In normal operation, with water flowing, the temperature difference will vary according to the flow rate: there will be a significant $\Delta\theta$ value in the case of effective flow rate and a low $\Delta\theta$ value at zero in the event of prolonged zero flow rate.

If the meter 1 is blocked, that is to say if it supplies no measured flow-rate value while the liquid flows through the meter, the flow-rate measurement supplied by the meter will systematically have a zero value, even in the case of a considerable real flow rate. In this case therefore, a considerable $\Delta\theta$ value will be obtained for a prolonged measured zero flow rate, which is an abnormal situation: it can then be concluded, at that time, without doubt, that the meter 1 is blocked.

FIG. 3 illustrates the variation in the temperature difference $\Delta\theta$ shown by the dashed-line curve A, the values of $\Delta\theta$ expressed in ° C. being recorded on the y axis situated on the right of the figure. The time is recorded on the x axis and is expressed in seconds. The real flow rate is shown by the solid-line curve B and the flow-rate values are recorded on the y axis situated on the left and expressed in liters/hour or L/h.

In the example shown, the flow rate is zero until the moment 20 s. Consequently, the value $\Delta\theta$ (the difference between the ambient temperature and the temperature of the fluid) is zero. Around the moment 20 s, the flow rate increases sharply to rise to the value of 500 L/h. The temperature difference $\Delta\theta$ increases, with a certain lag, to reach the value of 4° C. When the flow rate is cut off toward the moment 100 s and remains cut off, the value of $\Delta\theta$ goes down again to the zero value reached toward the moment 170 s.

This reduction in the difference $\Delta\theta$, when it is detected and when no flow rate is indicated by the meter, constitutes an alarm indicating that the meter of blocked or faulty. Before taking action, it is possible to ensure that the alarms are repeated and fix, for example, a minimum number of alarms over a determined period before taking action. It is also possible to total the time during which Δθ exceeds the determined limit when no flow rate is indicated by the meter.

For a hot water meter, the operation is similar, but the values are inverted: the temperature of the fluid is higher than the ambient temperature in the event of effective flow rate. Δθ corresponds to the difference between the temperature of the fluid and that of the ambient temperature. But the principle of detecting blockage of the meter remains the same: if Δθ is considerable, and if the measured flow rate supplied by the meter is zero, it is deduced therefrom that the meter is blocked.

FIG. 4 summarizes the decision model for the detection of the blockage and illustrates the blockage-detection algorithm introduced in the analysis means 5 of the electronic assembly E.

In FIG. 4, a table with two rows and two columns is marked out. The row L1 corresponds to a low temperature difference Δθ, for example less than 1° C., while the row L2 corresponds to a considerable Δθ, for example higher than 5° C. The column C1 corresponds to a meter-measured flow rate with a zero value while the column C2 corresponds to a non-zero flow rate, for example greater than 10 L/h.

The boxes L1C1 and L2C2 correspond to a normal operation not causing the triggering of an alarm.

The box L2C1 corresponds to an abnormal operation and produces a meter-blocked alarm.

The box L1C2 corresponds to an indeterminate situation triggering no alarm. The slight temperature difference while the flow rate is not zero results from a slight difference between the ambient temperature and the temperature of the fluid.

The blockage-detection algorithm will take account of the fact that the phenomena of temperature variation are slow and that it is necessary to wait for periods of stability for the measurements to be really useable.

Certain periods of the year will be more suited to the effective detection of the blocked meters, in particular the seasons of extreme temperatures (summer, winter) which make it possible to generate considerable temperature differences between the fluid and the ambient temperature.

The "meter-blocked" alarm could be reported on the meter display 1.

Moreover, if the meter is fitted with a remote meter-reading system, an alarm can be transmitted by the antenna 8 to notify the operator immediately after the appearance of the fault, which will make it possible to rapidly initiate a meter replacement, consequently reducing the quantity of water delivered without associated billing.

The invention claimed is:

1. A device for detecting blockage of a mechanical fluid meter, the device comprising:
    means (M) for measuring a temperature of fluid in the vicinity of the meter and of a temperature of the surroundings where the meter is, and
    analysis means (5) for establishing a temperature difference (Δθ) between the temperature of the fluid and the temperature of the surroundings, and for taking into account a value of the fluid flow rate supplied by the meter, the analysis means being programmed in order to display and/or transmit a meter-blocked item of information when the temperature difference (Δθ) is greater than a predetermined limit and when a flow-rate value supplied by the meter is zero.

2. The device as claimed in claim 1, wherein the predetermined limit is 5° C.

3. The device as claimed in claim 1, wherein the sensor (3) for sensing the temperature of the fluid is installed downstream of the meter (1), in the vicinity of this meter.

4. A mechanical meter for metering fluidic matter, the meter comprising electronic equipment (E) with means for metering, and further comprising:
    at least one sensor (3) for sensing a temperature of fluid in the vicinity of the meter and at least one sensor (4) for sensing a temperature of the surroundings in which the meter is installed;
    a means for connection between the temperature sensors (3, 4) and the electronic equipment (E), and
    analysis means (5) for establishing a temperature difference (Δθ) between the temperature of the fluid and the temperature of the surroundings, and for taking into account a value of the fluid flow rate supplied by the meter, the analysis means being programmed to display and/or transmit a meter-blocked item of information when the temperature difference (Δθ) is greater than a predetermined limit and when a flow-rate value supplied by the meter is zero.

5. The meter as claimed in claim 4, wherein the analysis means (5) are programmed to display and/or transmit a meter-blocked item of information when the temperature difference (Δθ) is greater than a predetermined limit, and when the flow-rate value supplied by the meter is zero.

6. The meter as claimed in claim 5, wherein the predetermined limit is 5° C.

7. The meter as claimed in claim 4, wherein the sensor (3) for sensing the temperature of the fluid is installed in the vicinity of the meter (1) upstream or downstream, or directly in the body of the meter.

8. The meter as claimed in claim 4, wherein the analysis means (5) are programmed to carry out analyses periodically and to transmit the meter-blocked item of information only after a minimum number of analyses, over a determined period, indicating a temperature difference (Δθ) greater than a determined limit while the flow-rate value supplied by the meter is virtually zero.

9. The meter as claimed in claim 4, wherein the analysis means (5) are programmed to total a time during which the temperature difference (Δθ) exceeds the determined limit when no flow rate is indicated by the meter, and to transmit a meter-blocked item of information only when the total time exceeds a predetermined value.

10. The meter as claimed in claim 5, wherein the electronic equipment is configured to carry out remote meter reading functions by radio transmission and to transmit the meter-blocked item of information remotely.

11. The meter as claimed in claim 4, wherein the fluid is water.

* * * * *